US008595625B2

(12) United States Patent
Hung et al.

(10) Patent No.: US 8,595,625 B2
(45) Date of Patent: Nov. 26, 2013

(54) METHOD AND APPARATUS TO AUTOMATE CONFIGURATION OF NETWORK ENTITIES

(75) Inventors: Grace Hung, Sunnyvale, CA (US); Christina S. Wu, Saratoga, CA (US); Desyang L. Lyou, Pleasanton, CA (US); Christine Cheng, Dublin, CA (US); Annie Dang, Danville, CA (US)

(73) Assignee: Tellabs San Jose, Inc., Naperville, IL (US)

( * ) Notice: Subject to any disclaimer, the term of this patent is extended or adjusted under 35 U.S.C. 154(b) by 1384 days.

(21) Appl. No.: 11/869,649

(22) Filed: Oct. 9, 2007

(65) Prior Publication Data

US 2009/0094521 A1 Apr. 9, 2009

(51) Int. Cl.
*G06F 15/177* (2006.01)
(52) U.S. Cl.
USPC .......................................... 715/735; 709/220
(58) Field of Classification Search
USPC ........... 715/734, 735, 736, 744; 709/220, 223
See application file for complete search history.

(56) References Cited

U.S. PATENT DOCUMENTS

| | | | | |
|---|---|---|---|---|
| 5,832,503 A | * | 11/1998 | Malik et al. | 709/223 |
| 7,002,907 B1 | * | 2/2006 | Chen et al. | 370/222 |
| 7,249,170 B2 | * | 7/2007 | Tindal et al. | 709/223 |
| 7,411,915 B1 | * | 8/2008 | Spain et al. | 370/250 |
| 7,457,853 B1 | * | 11/2008 | Chari et al. | 709/220 |
| 7,720,940 B1 | * | 5/2010 | Wilsey et al. | 709/220 |
| 2004/0172412 A1 | * | 9/2004 | Files et al. | 707/104.1 |
| 2005/0027835 A1 | * | 2/2005 | Raikar et al. | 709/222 |
| 2006/0026267 A1 | * | 2/2006 | Godin et al. | 709/220 |
| 2008/0005344 A1 | * | 1/2008 | Ford et al. | 709/230 |

* cited by examiner

*Primary Examiner* — Rashawn Tillery
(74) *Attorney, Agent, or Firm* — Fitzpatrick, Cella, Harper & Scinto

(57) ABSTRACT

A method and apparatus for automating the configuration of network entities with a network management system. More particularly, a graphical user interface incorporates a template to allow administrators to configure attributes of network entities. The graphical user interface and template reduce the number of blocks required to configure network entities and also minimize user errors. The graphical user interface also allows an administrator to add and manage templates for future use. The method and apparatus are also for monitoring the progress of configuring network entities and generating an operation log.

16 Claims, 13 Drawing Sheets

METHOD AND APPARATUS TO AUTOMATE CONFIGURATION OF NETWORK ENTITIES

BACKGROUND

1. Field

Example aspects of the present invention generally relate to a method and apparatus for configuring network entities. More particularly, example aspects of the present invention relate to using a graphical user interface incorporating a template to automate the configuration of network entities with a network management system and a template handler that implements the business logic.

2. Related Art

One or more network management systems may reside in between networks or on any given network. Network management systems are a combination of hardware and software components used to monitor, control, and configure network participants. Each network participant communicates with the network using a network entity called a network interface. Hereinafter, network participants will be referred to as network elements.

Network elements can reside within a network or across several different networks and can include, but are not limited to, routers, access servers, switches, bridges, hubs, computer hosts, and printers. Network elements collect and store information available to network management systems using agents.

An agent is a network management software module that resides in a network element and has local knowledge of management information. The agent translates the local management information into a form that is compatible with a network management system so that the network management system may use the network element's local information. The agent can also receive management information, such as configuration requests, from the network management system.

Network entities can constitute the network elements themselves or components of network elements such as network cards, ports, channels, or interfaces. It is often necessary in industries, such as the telecommunications industry, to configure various network entities for different protocols to accommodate changes in a network. For example, it might be necessary to configure network entities for different multi-service interfaces such as IP, MPLS, PPP/POS, HDLC, ATM, EoS (X.86), GFP, and TDM. However, making such configuration changes is often time consuming and error-prone due to the large number of network entities on a given network.

Network entities are traditionally configured individually by an administrator with a command line interface on the network elements or with a craft terminal provided by a network management system. This manual process can be error-prone due to the large number of entries required at the command line interface for each network entity. The process of configuring each network entity individually is also time consuming, especially when there are a large number of network entities. Many of these network entities often require similar configurations.

Network entities can also be configured by writing and executing scripts. Scripts are written by an administrator to make configuration changes and are interpreted by a computer program one command at a time. Administrators often repetitively copy, paste, and execute scripts for configuring similar network entities. Like the manual process of configuring network entities individually at a command line terminal, scripting is also time consuming and error-prone. The scripting approach requires time to write and execute each script and also requires administrators to check the configuration of the network entity after a script is executed.

BRIEF DESCRIPTION

An example embodiment of the present invention addresses the concerns above and presents a method and apparatus for automating the configuration of network entities. More particularly, an example embodiment of the present invention uses a graphical user interface incorporating a graphical template to reduce the number of blocks required to configure network entities and to minimize administrator errors. The graphical template has administrator modifiable areas corresponding to template attributes. The template attributes are extracted by a template handler that sends messages to agents of network elements on the network, which configure attributes of the network entities to match the extracted template attributes.

In a further example aspect of the present invention, the graphical user interface includes a graphical template management menu facilitating the addition and management of graphical templates. The graphical template management menu allows an administrator to add a new graphical template by selecting a template type corresponding to network entities to be configured. The graphical user interface then allows an administrator to modify the new graphical template and apply the graphical template to selected network entities.

The graphical template management menu also allows an administrator to copy and modify an existing template to create a new template. New templates can then be saved and managed by the administrator to reduce time in making similar configurations in the future.

In another example aspect of the present invention, extracted template attributes are checked so that only a valid configuration is applied to network entities. This feature aids in minimizing user errors.

In yet another example aspect of the present invention, the graphical user interface displays a graphical progress dialog for monitoring the application of the extracted template attributes to the network entities based on messages sent by the template handler and confirmations received by the template handler. In addition, the network management system generates an operation log based on the messages sent by the template handler and confirmations received by the template handler. The operation log can then help troubleshoot possible problems that develop in the network.

The template handler implements the business logic by processing and displaying templates and performing operations such as template creation, deletion, and modification of templates. Further, when processing the templates, the template handler monitors an apply operation for the application of existing templates or new templates created by the administrator. The template handler communicates the progress of the template application to the graphical user interface as described above.

Additional advantages and features of various example embodiments of the present invention will become apparent to those skilled in the art upon an examination of the following detailed description of example embodiments.

BRIEF DESCRIPTION OF THE DRAWINGS

The features and advantages of the example embodiments of the invention presented herein will become more apparent from the detailed description set forth below when taken in conjunction with the drawings in which like reference numbers indicate identical or functionally similar elements.

DETAILED DESCRIPTION

Figure 1:
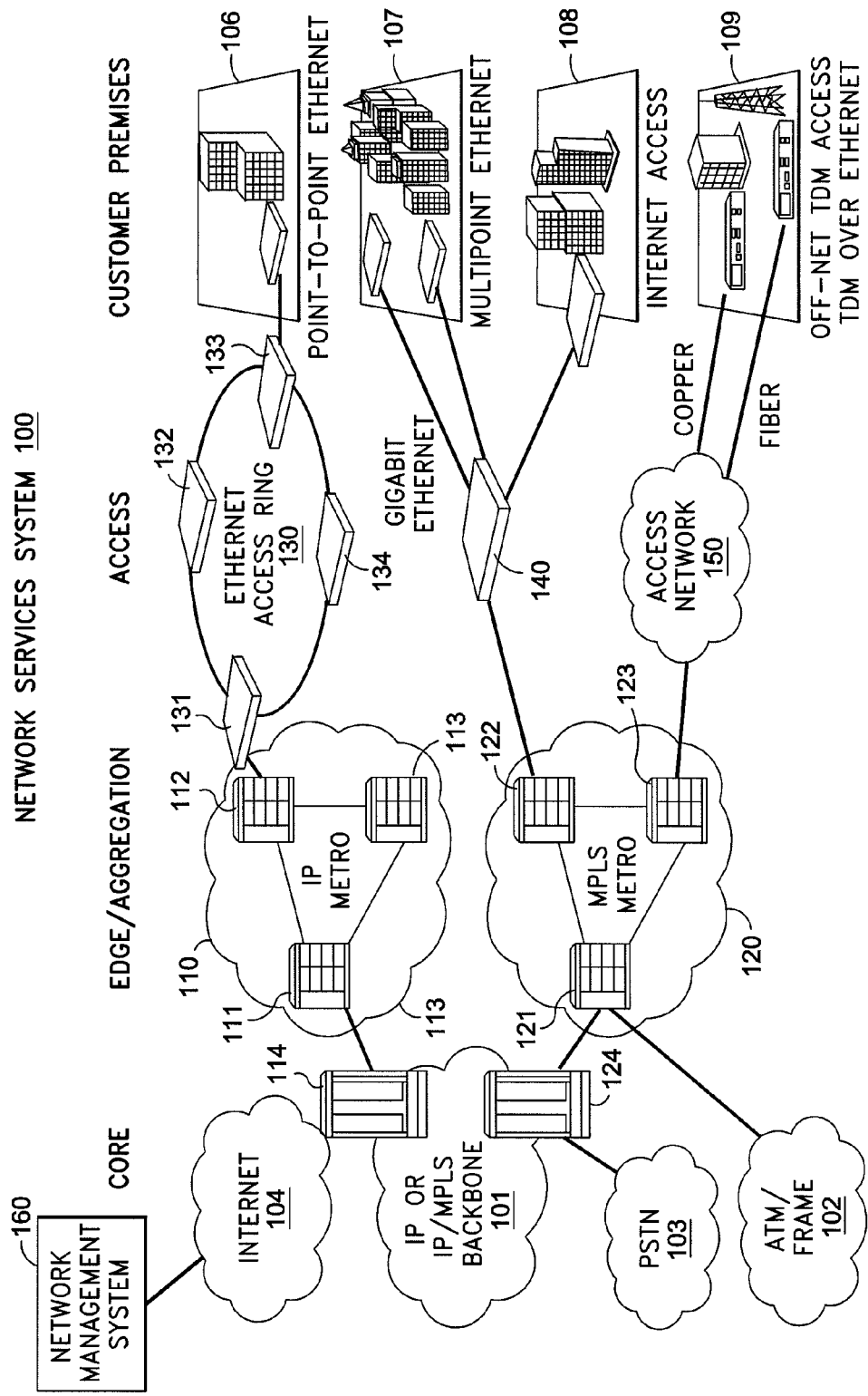
FIG. 1 shows a network services system suitable for practicing an example embodiment of the invention.

FIG. 1 is a block diagram of a network services system 100 in which a network management system 160 according to an example embodiment of the present invention is operable. In the illustrated example embodiment, the network services system 100 comprises an Internet Protocol (IP)/Multi-Protocol Label Switching (MPLS) Backbone 101, core networks 102, 103, and 104, and customer premises 106, 107, 108, and 109. The network services system 100 further comprises two metropolitan networks IP Metro 110 and MPLS Metro 120, multi-service routers 114 and 124, and means for business and consumer access through Ethernet networks such as the Ethernet Access Ring 130, Gigabit Ethernet 140, and means for communication access such as the Access Network 150. As illustrated in the example embodiment, the IP Metro 110 and the MPLS Metro 120 include multi-service routers, such as multi-service routers 111, 112, and 113 and 121, 122, and 123, respectively. Moreover, the Ethernet Access Ring 130 includes Ethernet access nodes, such as nodes 131, 132, 133, and 134.

Traditionally, various types of interconnecting mechanisms may be employed for interconnecting the above components such as, for example, optical fibers, wires, cables, switches, wireless interfaces, routers, modems, and/or other types of communication equipment, as can be readily appreciated by one skilled in the art, although, for brevity, all such mechanisms are not explicitly identified in FIG. 1.

As part of the core of the network services system 100, the IP/MPLS Backbone 101 provides a path for the exchange of information between different networks, such as core networks 102, 103, 104, and metropolitan networks IP Metro 110 and MPLS Metro 120. The IP/MPLS Backbone 101 can be used to carry many different kinds of traffic including, for example, IP packets, native Asynchronous Transfer Mode (ATM), SONET, and Ethernet frames. Both of the multi-service routers 114 and 124 direct the path of the traffic between networks, such as 102, 103, and 104 and the IP/MPLS Backbone 101. The multi-service routers 114 and 124 support many kinds of traffic including, for example, business class IP, Frame Relay, ATM, Ethernet, and Time Division Multiplexing (TDM)/Private Line Services.

According to the illustrated example embodiment, network 103 is the Public Switch Telephone Network (PSTN) that is a network of public circuit-switched telephone networks, the network 102 operates in accordance with ATM technology and/or Frame Relay technology, and the network 104 represents the Internet, adhering to TCP/IP protocols. Further, the IP Metro 110 and the MPLS Metro 120 networks are constructed of multi-service routers 111, 112, and 113 and 121, 122, and 123, respectively, that can operate at the Provider's Edge or as an aggregation device that feeds into the edge of the IP/MPLS Backbone 101. The multi-service routers 111, 112, 113, 121, 122, and 123 can aggregate many different services such as, for example, ATM, Ethernet, Frame Relay, and TDM services and perform interworking services among these same services, either through the IP/MPLS Backbone 101 or in native form. It should be made clear, however, that an example embodiment of the present invention should not be construed as being limited for use only with one or more particular types of networks.

As illustrated in the example embodiment, the Ethernet Access Ring 130 consists of multiple Ethernet access nodes, such as 131, 132, 133, and 134, that enable delivery of simultaneous telephony, business and entertainment video, broadband data and Internet services using Ethernet over fiber optics and copper wire to customer premises such as, for example, customer premises 106, 107, 108, and 109. The Gigabit Ethernet 140 provides similar services as the Ethernet Access Ring 130, however, the Gigabit Ethernet 140 transmits Ethernet frames at a rate of one gigabit per second.

The network services system 100, when managed by the network management system 160, enables many services such as, for example, the customer premise 106 representing Point-to-Point Ethernet, the customer premise 107 that functions as Multipoint Ethernet, the customer premise 108 allowing internet access, and customer premise 109 representing Off-net TDM Access and TDM over Ethernet as provided by, for example, the Access Network 150. Other services enabled by the network services system 100 are, for example, Transparent LAN Service (TLS), Virtual Private LAN Service (VPLS), Internet Protocol Virtual Private Networks (IP-VPNs), Voice over Internet Protocol (VoIP), and Video.

Network management system 160 is a computer or farm of computers connected to one or more network elements (shown in FIG. 2) that facilitate the transmission, storage, and reception of information between different points, such as between networks 102, 103, and 104 and metropolitan networks 110 and 120. From a hardware standpoint, a network management system 160 typically includes one or more clients and servers (shown in FIG. 2), for performing the arithmetic and/or logical operations required for program execution, and disk storage media, such as one or more disk drives for program and data storage, and a random access memory, for temporary data and program instruction storage. From a software standpoint, network management system 160 typically includes client and server software residents on disk storage media, which, when executed, directs the network management system 160 in performing transmission, reception, and storage functions. The disk storage media is a computer readable medium such as any of a flexible disk (floppy disk), a hard disk, an optical disk, a magneto-optical disk, a compact disc (CD), a digital versatile disc (DVD), a read only memory (ROM), random access memory (RAM), erasable programmable read only memory (EPROM), and the like.

The server software runs on an operating system stored on the disk storage media, such as, for example, UNIX or Windows NT. As is well known in the art, server computers can run different operating systems, and can contain different types of server software, each type devoted to a different function, such as handling and managing data/information from a particular source, or transforming data/information from one format into another format. It should thus be clear that the teaching of an example embodiment of this invention is not to be construed as being limited for use with any particular type of server computer, and that any other suitable type of device for facilitating the exchange and storage of information may be employed instead.

Figure 2:
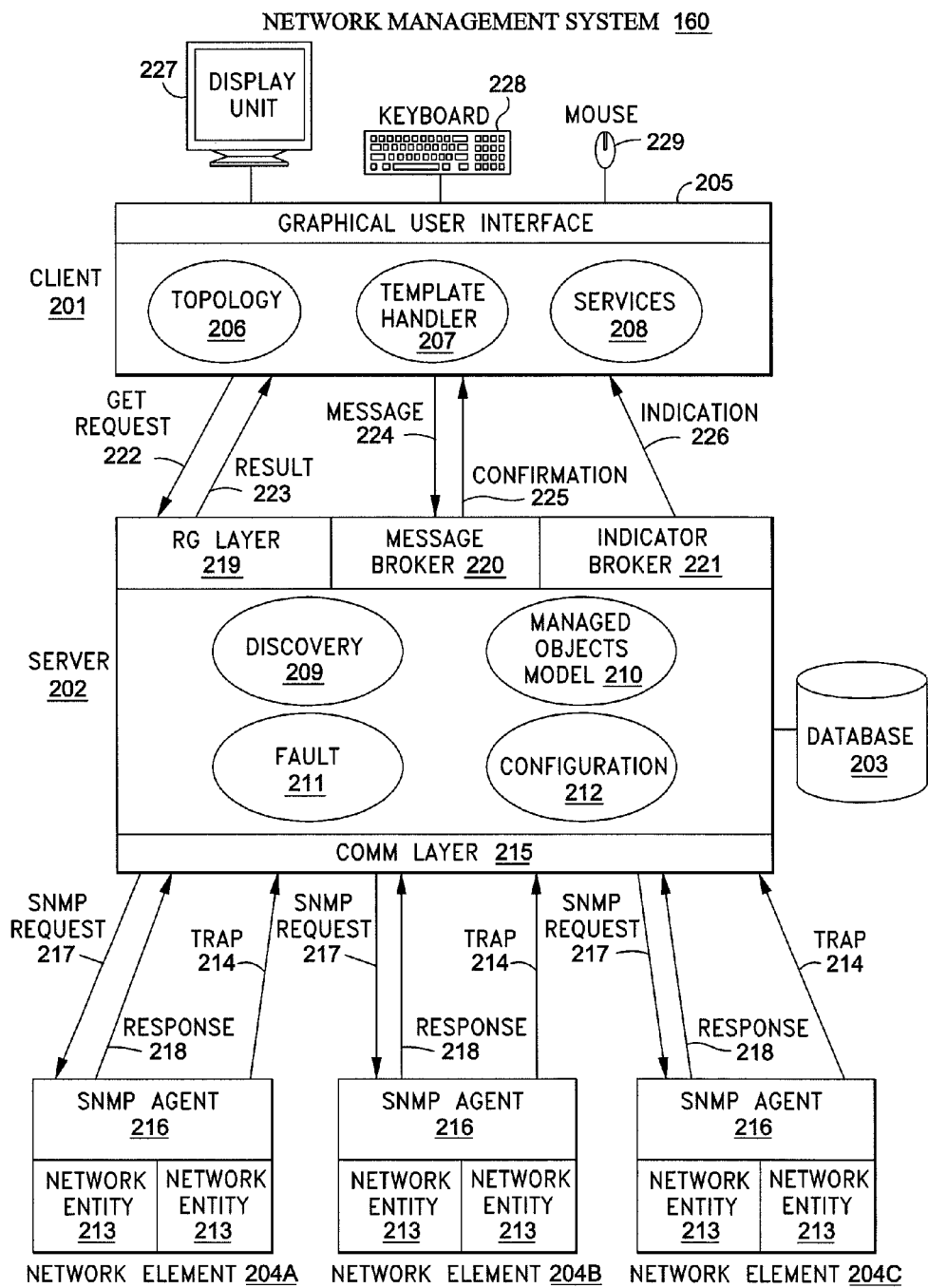
FIG. 2 illustrates an example of a network management system and network elements incorporating an example embodiment of the present invention.

FIG. 2 illustrates an example of network management system 160 coupled to network elements 204A, 204B, and 204C suitable for practicing an example embodiment of the present invention. The network elements 204A, 204B, and 204C could correspond to multi-service routers 111, 112, 113, 121, 122, 123, 114, or 124 in FIG. 1. The network elements 204A, 204B, and 204C could also correspond to, but are not limited to, access servers, switches, bridges, hubs, computer hosts, or printers within networks 102, 103, 104 and metropolitan networks IP Metro 110 and MPLS Metro 120.

The network elements 204A, 204B, and 204C may reside within the same network as the network management system 160 or may reside in a different network than the network management system 160. The various network elements 204A, 204B, and 204C may also reside in different networks from each other, such as networks 102, 103, 104, IP Metro 110, and MPLS Metro 120.

The network management system 160 may reside outside of the networks 102, 103, and 104, as in FIG. 1, or may also reside within a network, such as networks 102, 103, and 104. Each network may also accommodate multiple network management systems.

The example of network management system 160 in FIG. 2 includes a client 201, a server 202, and a database 203. A network management system, however, could also comprise multiple clients, servers, and databases.

The client 201 includes a graphical user interface 205 to communicate with an administrator and to allow the administrator to input network management information into the network management system 160. The client 201 also includes several components such as a topology component 206, a template handler component 207, and a services component 208. The topology component 206 processes and displays network topology such as network element 204 creation or deletion. The template handler component 207 processes and displays templates and performs operations such as template creation, deletion, and modification in accordance with an example embodiment of the present invention. The services component 208 processes and displays network services such as circuit provisioning or label switched path (LSP) provisioning.

The server 202 can include components such as a discovery component 209, a managed objects model component 210, a fault component 211, and a configuration component 212. Each of these are described below.

The discovery component 209 retrieves, processes, and stores inventory information about network entities 213. Network entities 213 are components of network elements 204, such as, for example, network cards, ports, channels, or interfaces.

The managed objects model component 210 synchs the attributes of the network entities 213 in the cache with the attributes stored in the database 203. The attributes of the network entities 213 are cached in the managed objects model component 210 as managed objects.

The fault component 211 receives and processes traps 214 sent by SNMP agents 216 that indicate changes at the network elements 204. The fault component 211 translates the traps 214 into alarms or events. The fault component 211 also stores the event or alarm in the database 203 if needed.

The configuration component 212 services requests from the client 201 to configure and provision network entities 213 by constructing and submitting requests to the COMM layer 215.

The COMM layer 215 submits the requests constructed by the configuration component 212 as SNMP requests 217 to the appropriate network element's SNMP agent 216. The COMM layer 215, however, could also communicate with network element agents using other protocols such as FTP or SFTP, and the use of an example embodiment of the present invention is not limited to only using SNMP to communicate with network elements 204.

Each network element 204A, 204B, and 204C includes an SNMP agent 216. The SNMP agent 216 is a network management software module that resides at a network element and has local knowledge of management information. The SNMP agent 216 translates local management information into a form that is compatible for use by the network management system 160. The SNMP agent 216 can also receive management information, such as SNMP requests 217, from the COMM layer 215.

The SNMP requests 217 can include requests such as setting an attribute for a network entity 213 or getting local management information from the network element 204. After performing the SNMP request 217, the SNMP agent 216 sends a response 218 to the COMM layer 215. A typical response 218 could include management information requested by the network management system 160 or a confirmation that a network entity 213 was successfully configured by an SNMP request 217.

A response 218 indicating that a network entity 213 was successfully configured is handled by the configuration module 212 after the response is received by the COMM layer 215. The message broker 220 then sends a confirmation 225 to the component, included in the client 201, that sent the message 224. In this example, the message broker 220 would send a confirmation 225 to the template handler 207 that the network entity 213 was successfully configured because the template handler 207 sent the message 224.

The client 201 communicates with the server 202 through the request gateway (RG) layer 219, message broker 220, and indication broker 221. The communication protocol between the client 201 and the server 202 could be, for example, Java RMI.

The RG layer 219 composes a list of application programming interfaces (APIs) for the client 201 to retrieve data from the database 203. The client 201 retrieves data using a get request 222 to the RG layer 219, and the RG layer 219 returns a result 223 to the client 201.

The message broker 220 processes client messages 224 for such functions as adding, deleting or modifying network entities 213. The message broker 220 also sends confirmations 225 to whichever of the components, the topology component 206, template handler 207, or services component 208, that sends the message 224, confirming that a particular client message 224 has been successfully performed.

The indication broker 221 forwards indications 226 to the client 201 that may include indications of changes at the network elements 204. Network changes are indicated from network elements 204 with traps 214. When the fault component 211 receives a trap 214, it determines whether the trap 214 corresponds to an event or an alarm and updates the database 203 accordingly. Once the database 203 has been updated, an indication 226 is sent to a subscribing client 201 by the indication broker 221.

The client 201 is connected to a display unit 227 for displaying the graphical user interface 205. The client 201 is also connected to a keyboard 228 and a mouse 229 to allow the administrator to input information to the client 201.

Figure 3A:
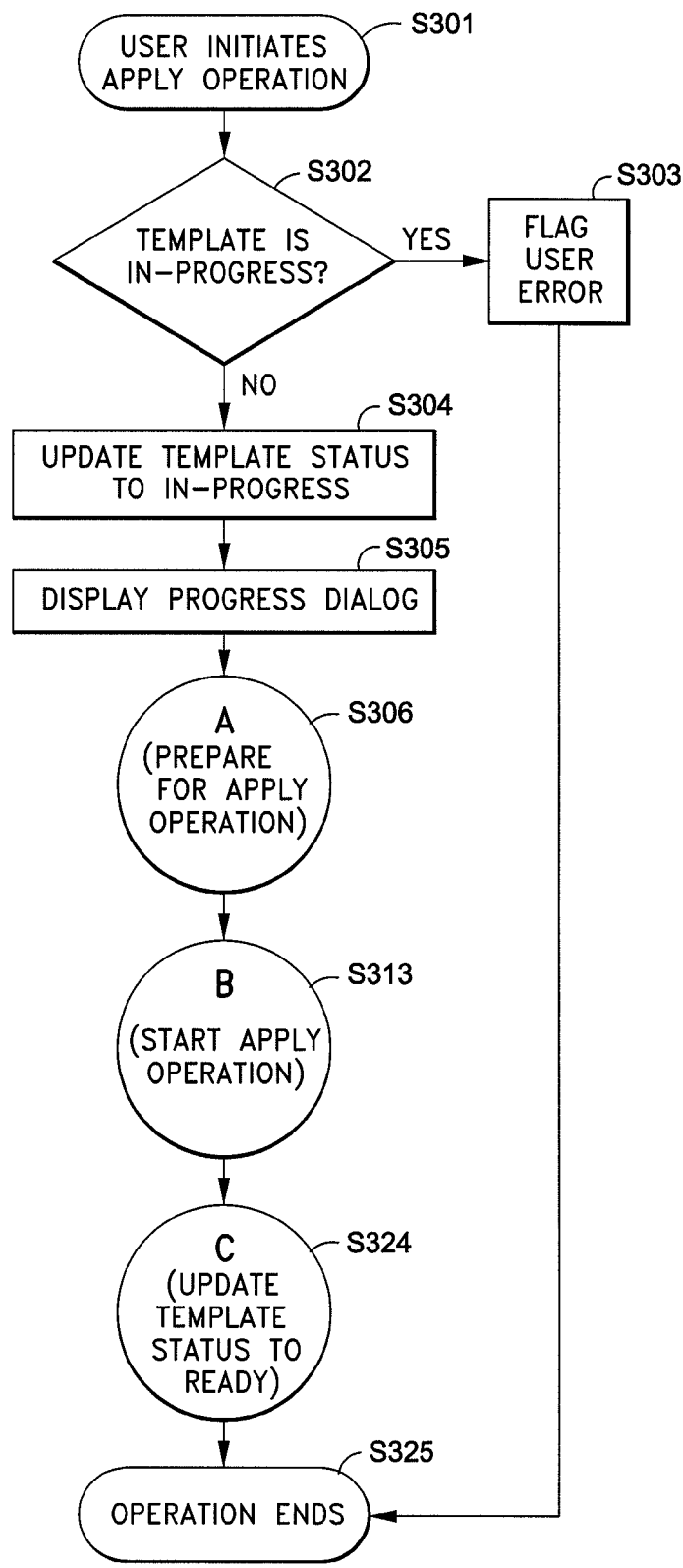
FIGS. 3A, 3B and 3C are a flowchart showing the blocks of a template handler applying template attributes and monitoring the apply operation in accordance with an example embodiment of the present invention.
Figure 3B:
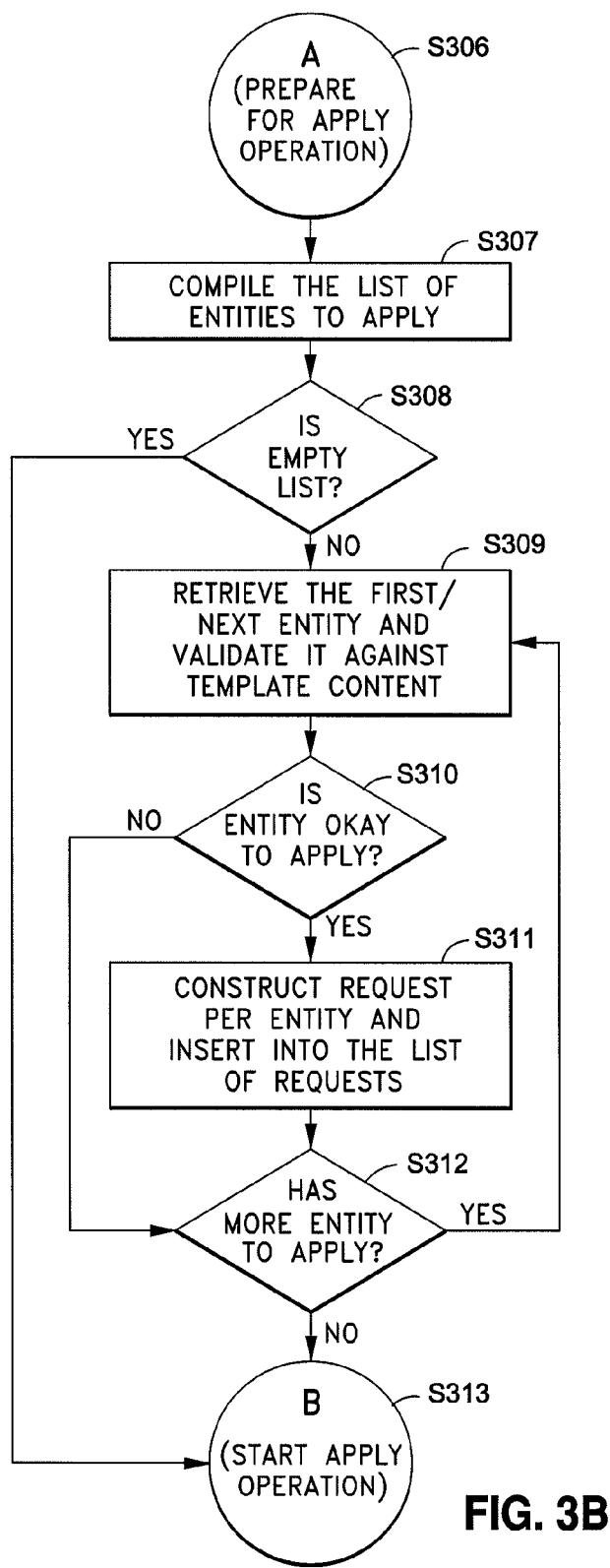
Figure 3C:
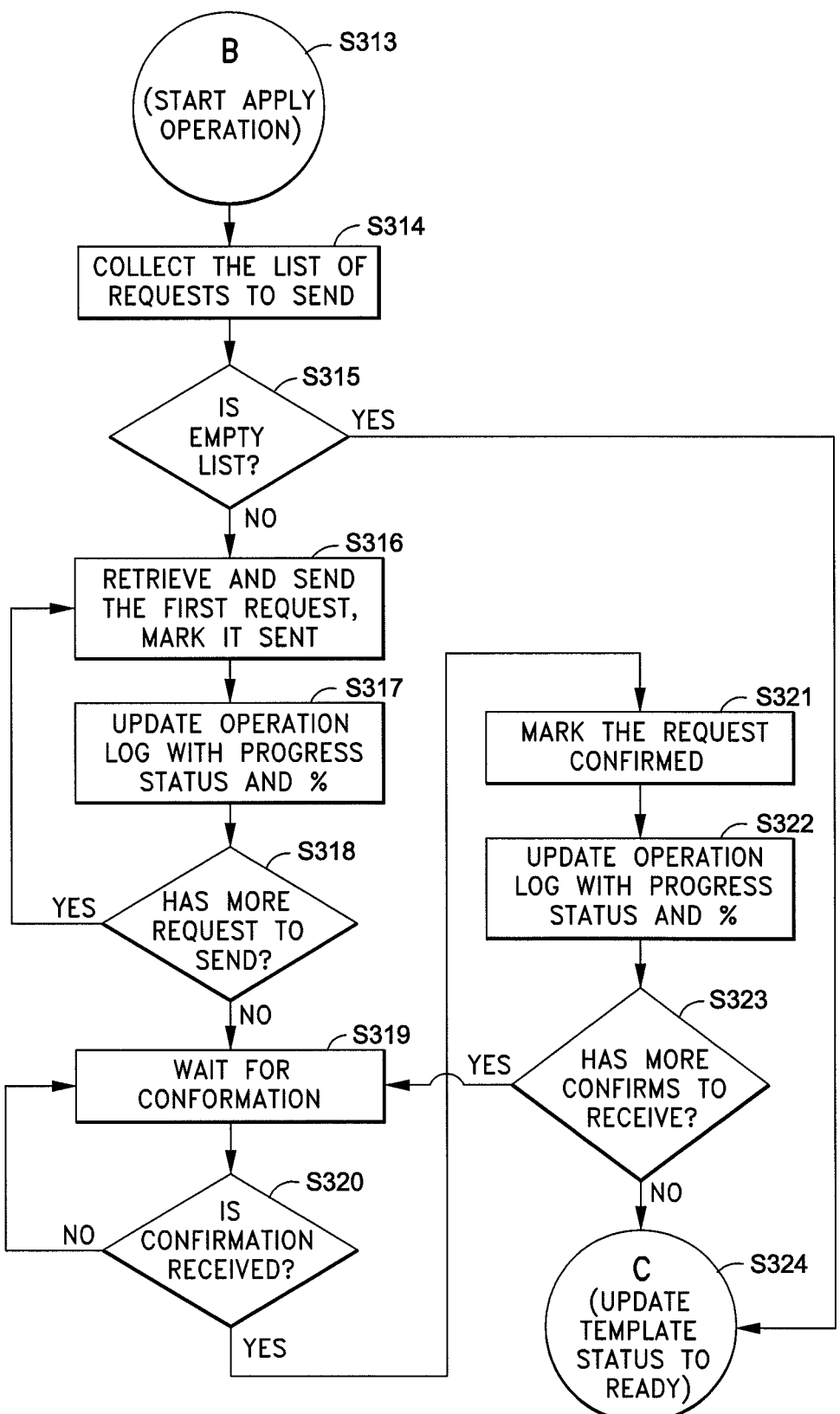

A flowchart illustrating an apply operation of an example embodiment of the present invention is shown in FIGS. 3A, 3B, and 3C. The apply operation can be initiated by an administrator in block S301, for example, by the administrator selecting an apply button in the graphical user interface 205 with the mouse 229.

After the administrator initiates the apply operation, the template handler 207 checks in block S302 whether an apply operation for the template being applied is already in-progress. If the template is already in-progress, the administrator is notified that the template is in-progress at block S303 and the apply operation ends at block S325.

If the template is not already in-progress, the template handler 207 updates the status of the template to "In-Progress" in block S304. This status can be shown in various template status fields as further discussed in the following example embodiments of a graphical user interface. The status fields could either show, for example, "In-Progress" or "Ready" in accordance with block S304.

After block S304, the template handler 207 proceeds to block S305 to display a progress dialog for monitoring the apply operation. The progress dialog can display, for example, notification of stages throughout the apply operation and the success or failure of sent configuration requests.

After displaying the progress dialog, the template handler 207 then progresses in block S306 to a preparation stage for the apply operation. The template handler 207 in block S307 first compiles a list of entities selected by the administrator in the graphical user interface 205.

If the list of entities to apply is empty, the template handler 207 proceeds to block S313 to start the apply operation stage. If the list of entities to apply is not empty, the template handler 207 proceeds to block S309 and retrieves the attributes of the first network entity on the list of entities to apply from the database 203 via the RG layer 219. The template handler 207 then compares the attributes of the first network entity with the template attributes configured in the graphical user interface 205. This comparison can check the configuration entered by the administrator to ensure that the first network entity 213 can accept the template attributes.

If the template handler 207 determines in block S310 that the template attributes are permissible based upon the comparison in block S309, the template handler 207 proceeds to block S311. If the template attributes are not permissible, the template handler 207 skips the first selected entity and proceeds to validate the next selected network entity in block S309 if the template handler 207 determines in block S312 that there are more selected entities in the list of entities to apply.

Once a template is determined to be permissible for application to a network entity 213, the template handler 207 in block S311 constructs a request for transmission and sends it to the message broker 220 as a message 224. The request in this example would include all of the template attributes for application to a selected network entity 213.

When the template handler 207 has either constructed a request or has determined that the template is not permissible for each selected entity on the list of entities to apply, the template handler 207 proceeds to the start apply operation stage in block S313.

In block S314, the template handler 207 collects the requests constructed in block S311 into a request list and proceeds to block S315. If the request list is determined to be empty in block S315, the template handler 207 proceeds to block S324.

If the request list is not empty, the template handler 207 in block S316 sends the first request as a message 224 to the message broker 220 and marks the request as sent. The template handler 207 then proceeds to block S317 and updates an operation log and may also update the progress dialog displayed in block S305.

After updating the status of the sent request, the template handler 207 in block S318 determines whether there are more requests to send from the request list. If there are more requests to send, the template handler 207 returns to block S316. If there are no more requests left, the template handler 207 proceeds to block S319 to wait for a confirmation 225 received from the message broker 220 corresponding to a sent request.

When a confirmation 225 corresponding to a sent request is received in block S320, the template handler 207 proceeds to block S321 to mark the request confirmed. In block S322, the template handler 207 then updates the operation log and may also update the progress dialog displayed in block S305.

The template handler 207 then proceeds to block S323 and determines whether there are confirmations 225 corresponding to sent requests that are still left to be received. If so, the template handler 207 returns to block S319 to wait for the remaining confirmations 225.

If there are no more confirmations 225 left to be received, the template handler 207 updates the template status to "Ready" in block S324. The template handler 207 then proceeds to block S325 ending the apply operation. After the apply operation ends, the administrator may then copy or save the operation log.

Figure 4:
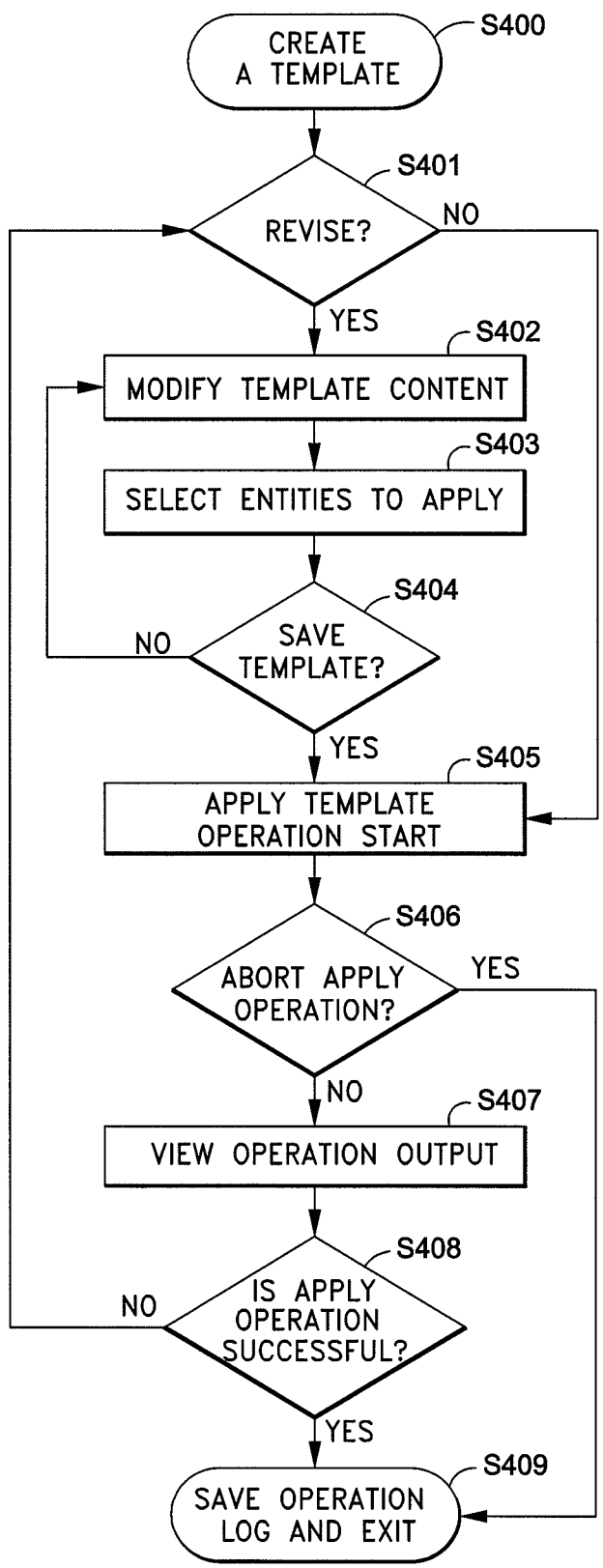
FIG. 4 is a flowchart showing the blocks performed by an administrator configuring a template and applying the template attributes to network entities in accordance with an example embodiment of the present invention.

FIG. 4 shows the blocks performed by an administrator in configuring a template and applying template attributes to network entities 213 using example embodiments of the present invention. The blocks in FIG. 4 include creating a template in block S400; deciding whether to revise the template in block S401, modifying the template content in block S402, selecting network entities 213 for application of the template attributes in block S402, saving the template in block S404, starting the apply operation in block S405, deciding whether to abort the apply operation in block S406, viewing the apply operation output in block S407, determining whether the apply operation was successful in block S408, and saving an operation log before exiting in block S409. Each block is described in further detail in the following discussion of example embodiments of a graphical user interface as shown in FIG. 5A through FIG. 9.

Figure 5A:
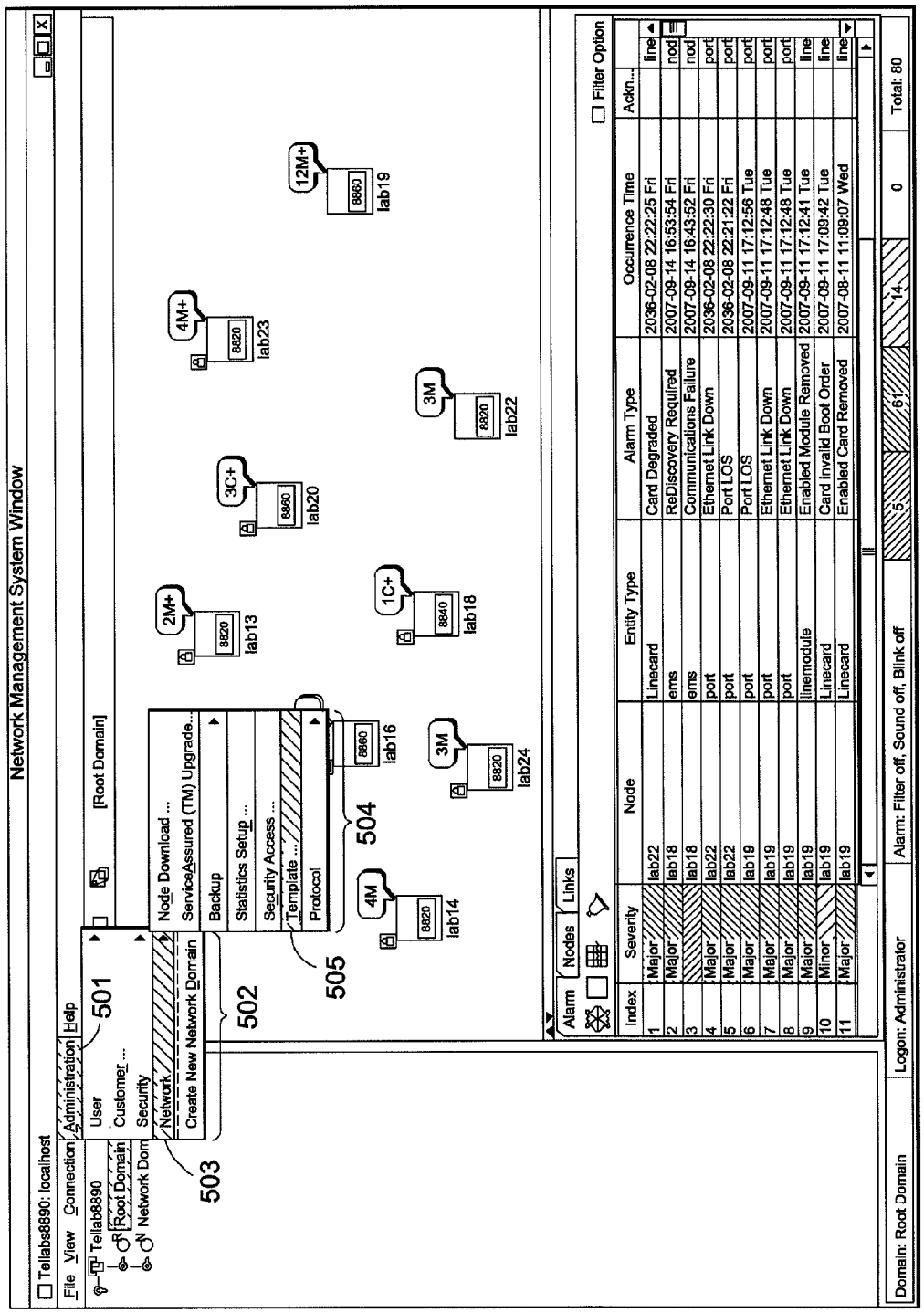
FIG. 5A shows a network management system window allowing the launch of a template menu.

FIG. 5A shows a network management system window that enables an administrator to launch the template summary 500. To open the template summary 500, the administrator left-clicks with the mouse 229 the administration 501 on the menu bar. The administrator then selects network 503 from the administration pull-down menu 502. Lastly, the administrator selects template 505 from the network menu 504, launching the template summary 500.

Figure 5B:
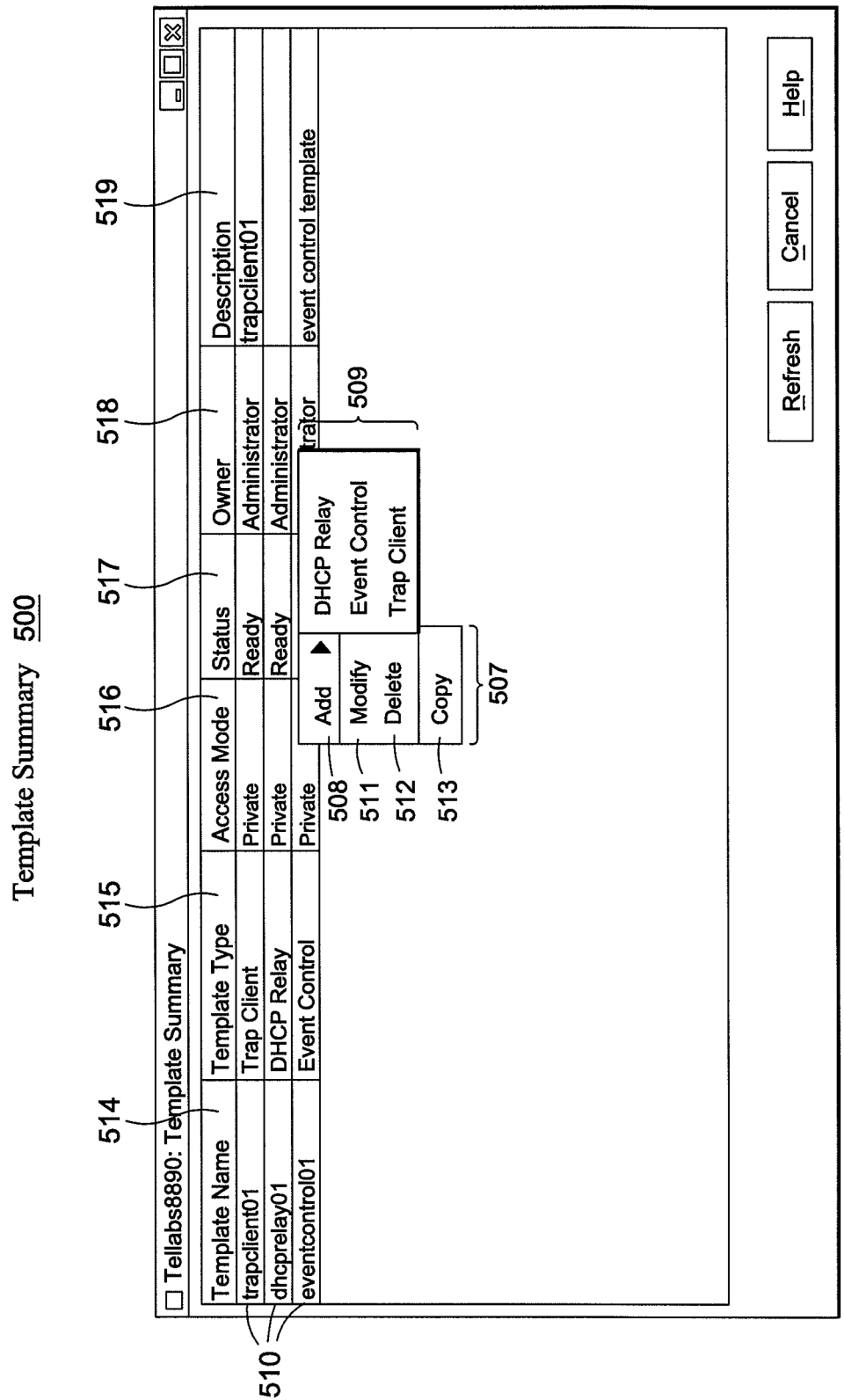
FIG. 5B is an example of a graphical user interface allowing the selection, addition, deletion, and copying of a template in accordance with an example embodiment of the present invention.

FIG. 5B is an example of one embodiment of the present invention's graphical user interface 205 as displayed at the display unit 227. The template summary 500 allows an administrator to manage templates and has six columns that are dynamically updated by the template handler 207. Columns 514 through 519 provide examples of template information including a template name column 514, template type column 515, access mode column 516, status column 517, owner column 518, and description column 519.

The following process corresponds to creating a template in block S400 of FIG. 4. To create a new template from the template summary 500, an administrator first brings up a template management menu 507 by right-clicking with the mouse 229 in the template summary 500. The administrator then selects add 508 from the template management menu 507 to create a new template from a list of saved template types 509. Each template type 509 corresponds to a type of network entity 213 and may include default settings for a particular type of network entity 213. The list of template types 509 in the present example embodiment is not exhaustive and can be expanded to accommodate additional types of network entities 213.

The template types 509 also correspond to template objects stored in the database 203. The template objects stored in the database 203 are templates created by the administrator.

When the administrator selects a template type 509 to create a template, the template handler 207 sends an add/create message 224 to the message broker 220. The message broker 220 then forwards the add/create message 224 to the configuration component 212 on the server 202 to create the template object and store the template object in the database 203. The configuration component 212 then sends the template object back to the client 201 through the message broker 220 as part of the confirmation 225, so that the template handler 207 can form and display a new template of the selected template type 509.

The template management menu 507 also allows an administrator to configure a saved template by selecting a template row 510 and selecting modify 511, or by double-clicking with the mouse 229 on a template row 510. When a template row 510 is selected or modified, the template handler 207 sends a get request 222 to the RG layer 219 in order to retrieve a saved template object corresponding to the entity row 510 selected by the administrator. The server 202 then retrieves the associated saved template object from the database 203 and sends the template object as a result 223 to the client 201 so that the template handler 207 can form and display the saved template. This saved template is already populated with saved template attributes.

An administrator may also delete a given template row 510 from the template summary 500 by selecting the template row 510 and then selecting delete 512 on the template management menu 507. The template handler 207 will then remove the template row 510 from the template summary 500. The template handler may also construct a message 224 that is sent to the message broker 220 instructing the server 202 to delete a saved template object from the database 203. After the saved template object has been deleted from the database 203, the message broker then sends a confirmation 225 to the client 201 and the template handler 207 removes the corresponding template row 510 from the template summary 500.

Figure 6:
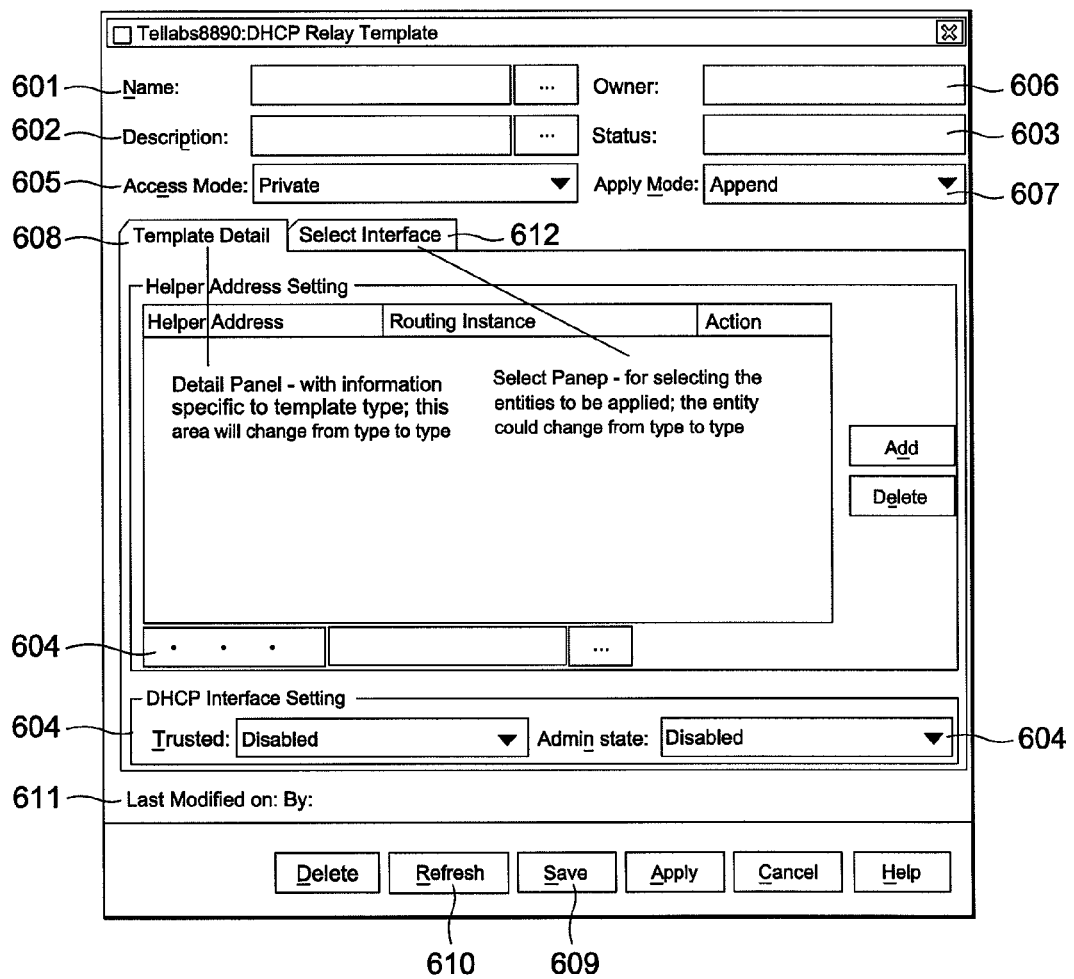
FIG. 6 is an example of a graphical user interface displaying a template allowing the configuration of template attributes in accordance with an example embodiment of the present invention.

To copy a template, an administrator selects a template row 510 and selects copy 513 on the template management menu 507. The template handler 207 will then retrieve the corresponding saved template object from the database 203 via the RG layer 219 and then form and display a template already populated with the saved template content of the selected template. The copied template, however, will have an empty name field 601, description field 602, and status field 603 as shown in FIG. 6. The administrator may then supply a name and description for the copied template using the keyboard 228.

Table 1 lists example template object interfaces that can be implemented with JAVA software code in network management system 160. The template handler 207 can use template object interfaces, such as those listed in Table 1, to add, delete, retrieve, or modify template objects in the messages 224 or get requests 222 described above.

TABLE 1

Example Template Object Interfaces

Interface Package:
// template interface definition
public interface INetTemplate extends IGenericObject {
   String STATUS = "nettemplatestatus";
   String DESCRIPTION = "nettemplatedescription";
   String OWNER = "nettemplateowner";
   String LAST_MODIFY_USER = "nettemplatelastmodifyuser";
   String LAST_MODIFIED_TIME = "nettemplatelastmodifiedtime";
   String ACCESS_MODE = "nettemplateaccessmode";
   public String getNetTemplateName( );
   public NetTemplateType getNetTemplateType( );
   public NetTemplateStatus getNetTemplateStatus( );
   public String getNetTemplateOwner( );
   public String getDescription( );
   public String getLastModifyUser( );
   public Calendar getLastModifiedTime( );
   public NetTemplateAccessMode getAccessMode( );
// fdn: nettemplate:type/name
}
// template type definition
public final class NetTemplateType extends Enum {
   public static final int NONE = 0;
   public static final int DHCP = 1;
   public static final int EVENT_CONTROL=2;
   public static final int TRAP_CLIENT=3;
   public static final NetTemplateType Dhcp = new NetTemplateType DHCP,"DHCP");
   public static final NetTemplateType EventControl = new NetTemplateType(EVENT_CONTROL, "Alarm Control");
   public static final NetTemplateType TrapClient = new NetTemplateType(TRAP_CLIENT, "Trap Client");
}
Message Package:
// Template data structure
public class NetTemplateDetails extends GenericObjectDetails implements INetTemplate
{
   private String m_description;
   private String m_templateName;
   private NetTemplateType m_templateType;
   private NetTemplateStatus m_templateStatus;
   private String m_owner;
   private String m_lastmodifyuser;
   private Calendar m_lastmodifiedtime;
   private NetTemplateAccessMode m_accessmode;
...
}
// add Template request
public class AddNetTemplateRequest extends RequestImpl implements INetworkMarkerRequest { ...}
// modify Template request
public class ModifyNetTemplateRequest extends RequestImpl implements INetworkMarkerRequest {...}
// delete Template request
public class DeleteNetTemplateRequest extends RequestImpl implements INetworkMarkerRequest {...}
Server Package:
// Template database object
public class NetTemplate extends DbObject implements INetTemplate TABLE 1-continued Example Template Object Interfaces

```
{
   private String m_templateName=null;;
   private NetTemplateType m_templateType=null;
   ...
}
// add Template request logic handler
public class AddNetTemplateRequestLogic extends
RequestImplLogic {...}
// modify Template request logic handler
public class ModifyNetTemplateRequestLogic extends
RequestImplLogic {...}
// delete Template request logic handler
public class DeleteNetTemplateRequestLogic extends
RequestImplLogic {...}
RG API in NetworkModel:
// return 1 Template base on its FDN
public INetTemplate getNetTemplate(String templateFdn) {...}
// return a list of Templates, fdn should be null
public List getNetTemplates(String fdn) {...}
// return a list of Template names, fdn should be null
public List getNetTemplateNames(String fdn) {...}
```

The example of template 600 in FIG. 6 allows an administrator to configure template attributes 604. The following description corresponds to the template configuration blocks S401, S402, S403, and S404 in FIG. 4.

In FIG. 6, an administrator enters a template name in the name field 601 and a template description in the description field 602. The administrator also enters other general template content such as whether access to the template is restricted in the access mode field 605. Other general template content also includes an owner field 606 and a status field 603. The owner field 606 indicates the administrator who created the template and the status field 603 indicates whether the template 600 is in the process of being applied to network entities 213. The administrator also selects an apply mode 607 that indicates whether a particular template should replace attributes or append to attributes already configured at network entities 213. The apply mode 607 varies with different template types 509.

The template 600 also includes a detail panel 608 that allows the administrator to configure template attributes 604. After setting template attributes 604 in the detail panel 608, the administrator can save the configured template to the database 203 by selecting the save button 609. This corresponds to saving a template in block S404 of FIG. 4.

After the administrator selects the save button 609, the template handler 207 constructs a template object from the template content. The template object is then sent as a message 224 to the message broker 220. The server 202 then saves the template object in the database 203 and returns a confirmation 225 via the message broker 220 that the template object was saved. The template handler 207 then adds a template row 510 corresponding to the saved template.

Template items correspond to template content such as template attributes 604 that are stored as part of a template object. When modifying only part of a previously saved template, the template handler constructs template items corresponding to the modified template content rather than constructing an entire template object as described above. The template items are then sent as a message 224 to the message broker 220 so that the server 202 can overwrite the modified template items in the database 203.

After a template is saved, the detail panel 608 can be refreshed with template items from the saved template object stored in the database 203 by selecting the refresh button 610. The template handler 207 refreshes template content by sending a get request 222 to the RG layer 219 and the server 202 then retrieves the associated saved template items from the database 203. The RG layer 219 then sends the template items to the client 201 and the template handler 207 then replaces displayed template content with template content from the retrieved template items. However, not all template content may be refreshed. Some template content such as a list of selected entities, as discussed in reference to the entity rows 702 of FIG. 7, may not be refreshed.

Figure 7:
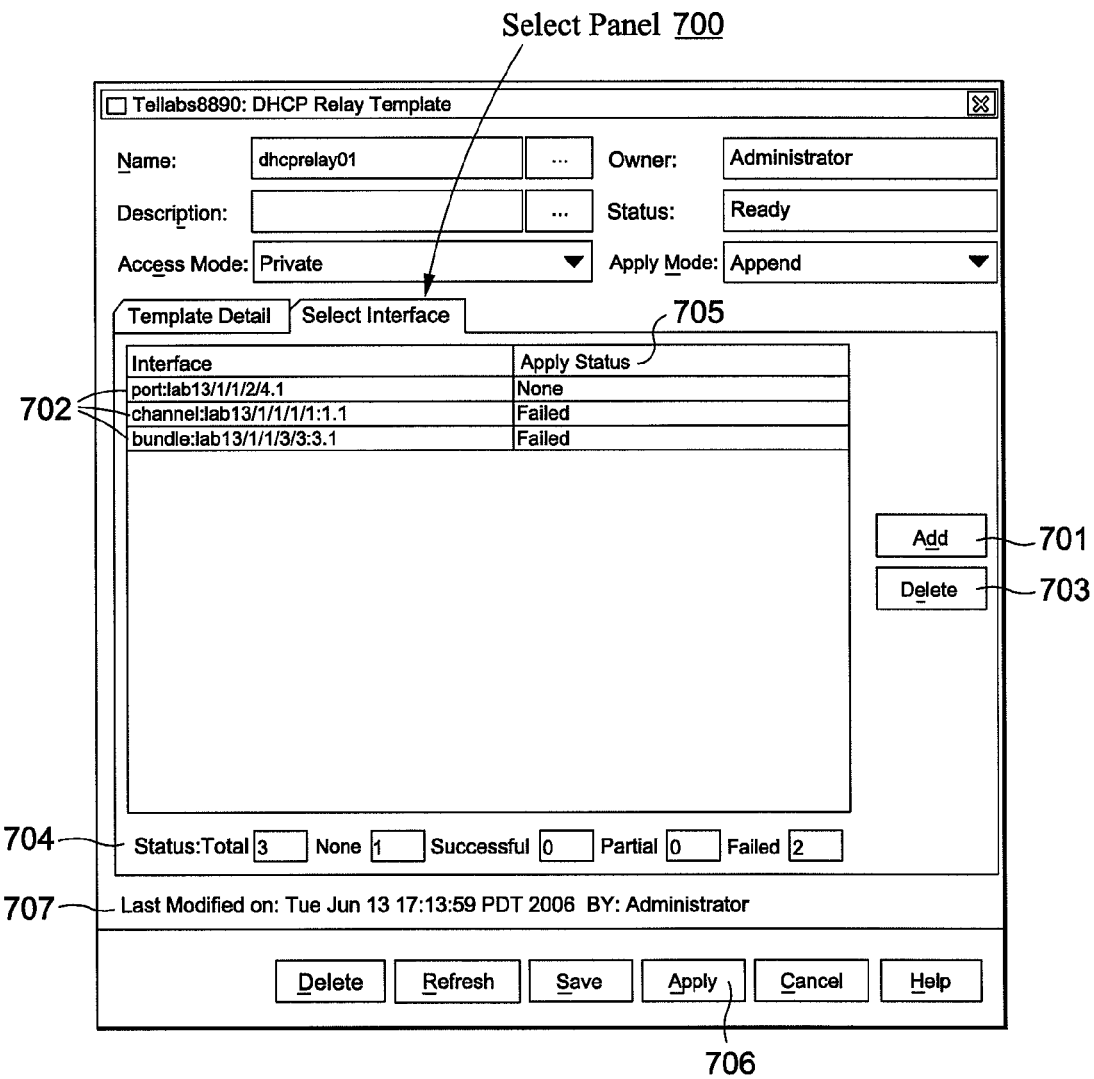
FIG. 7 is an example of a graphical user interface allowing the application of template attributes to selected network entities in accordance with an example embodiment of the present invention.

The template 600 also includes a modification history field 611 that indicates when the template was last modified and which administrator last modified the template. The modification history field is also shown in FIG. 7 as field 707.

Table 2 lists example interfaces for template items that can be implemented with JAVA software code in network management system 160. The template handler 207 can use template item interfaces, such as those listed in Table 2, to add, delete, retrieve, or modify template items in the messages 224 or get requests 222 described above.

TABLE 2

Example Template Item Interfaces

```
Interface Package:
// Template item interface
public interface INetTemplateItem extends IGenericObject
{
   public String getNetTemplateName( );
// fdn: nettemplateitemname:templateName/... (fdn varies base on the template type)
}
// Helper address Template item example:
public interface IHelperAddrNetTemplateItem extends IDhcpHelperAddrBase,
INetTemplateItem
{
   public String getRoutingInstName( );
// fdn: helperaddrnettemplateitem:tmplt_name/helper_addr/routing_instance_name
}
// DHCP interface Template item example:
public interface IDhcpIntfNetTemplateItem extends IDhcpRelayInterfaceBase,
INetTemplateItem {
// fdn: dhcpintfnettemplateitem:tmplt_name
}
Message Package:
Note: must define xxxNetTemplateItemDetails data structure and corresponding
Add/Modify/Delete requests for each template type
// Helper address Template item example:
```

TABLE 2-continued

Example Template Item Interfaces

```
public class HelperAddrNetTemplateItemDetails extends GenericObjectDetails
implements IHelperAddrNetTemplateItem, INetTemplateItem {...}
public class AddHelperAddrNetTIRequest extends RequestImpl implements
INetworkMarkerRequest {...}
public class DeleteHelperAddrNetTIRequest extends RequestImpl implements
INetworkMarkerRequest {...}
(no ModifyRequest for HelpAddrNetTemplateItem)
// DHCP interface Template item example:
public class DhcpIntfNetTemplateItemDetails extends GenericObjectDetails implements
IDhcpIntfNetTemplateItem, INetTemplateItem {...}
public class AddDhcpIntfNetTIRequest extends RequestImpl implements
INetworkMarkerRequest {...}
public class ModifyDhcpIntfNetTIRequest extends RequestImpl implements
INetworkMarkerRequest {...}
public class DeleteDhcpIntfNetTIRequest extends RequestImpl implements
INetworkMarkerRequest {...}
Server Package:
Note: must define xxxNetTemplateItem server Db object plus the Add/Modify/Delete
request logic handler for each template type
// Helper address Template item example:
public class HelperAddrNetTemplateItem extends DhcpHelperAddrBase
       implements IHelperAddrNetTemplateItem {...}
public class AddHelperAddrNetTIRequestLogic extends RequestImplLogic {...}
public class DeleteHelperAddrNetTIRequestLogic extends RequestImplLogic {...}
(no modifyRequestLogic for HelperAddress)
// DHCP interface Template item example:
public class DhcpIntfNetTemplateItem extends DhcpRelayInterfaceBase
       implements IDhcpIntfNetTemplateItem {...}
public class AddDhcpIntfNetTIRequestLogic extends RequestImplLogic {...}
public class ModifyDhcpIntfNetTIRequestLogic extends RequestImplLogic {...}
public class DeleteDhcpIntfNetTIRequestLogic extends RequestImplLogic {...}
RG API
in NetworkModel
// return 1 Helper address template item base on its FDN
public INetTemplateItem getHelperAddrNetTemplateItem(String fdn) {...}
// return a list of Helper address template items base on the template's FDN
public List getHelperAddrNetTemplateItems(String templateFdn) {...}
// return a list of Helper address template items' name base on the template's FDN
public List getHelperAddrNetTemplateItemNames(String templateFdn) {...}
// return 1 DHCP interface template item base on its FDN
public INetTemplateItem getDhcpIntfNetTemplateItem(String fdn) {...}
// return a list of DHCP interface template items base on the template's FDN
public List getDhcpIntfNetTemplateItems(String templateFdn) {...}
// return a list of DHCP interface template items' name base on the template's FDN
public List getDhcpIntfNetTemplateItemNames(String templateFdn) {...}
```

FIG. 7 shows the select panel 700 that is accessed in this example embodiment by selecting the select interface tab 612 in FIG. 6. The select panel 700 allows the administrator to select network entities 213 for applying the template attributes 604. The following description corresponds to selecting entities to apply in block S403 of FIG. 4.

Figure 8:
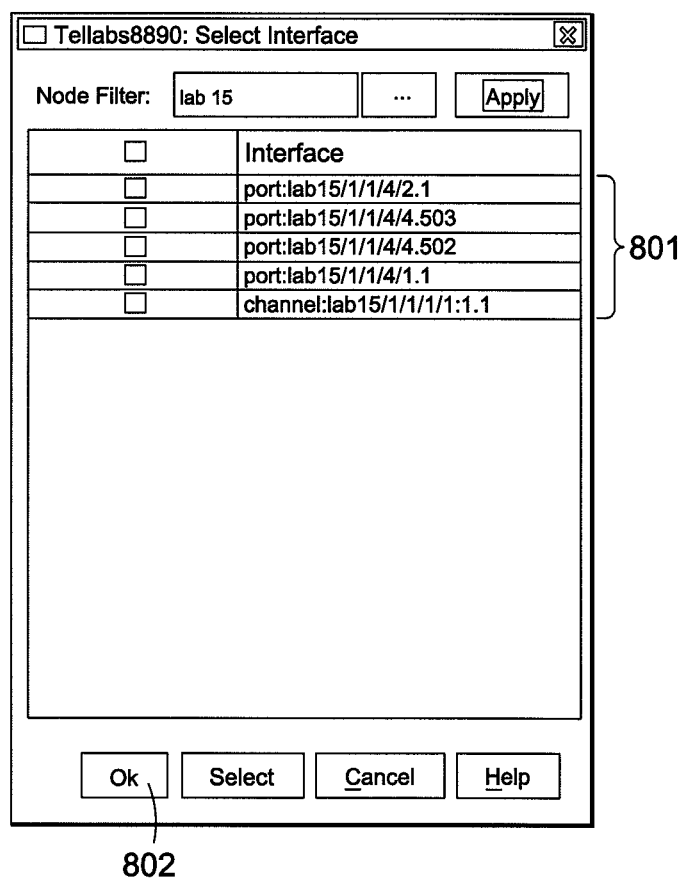
FIG. 8 is an example of a graphical user interface allowing the selection of network entities in accordance with an example embodiment of the present invention.
Figure 9:
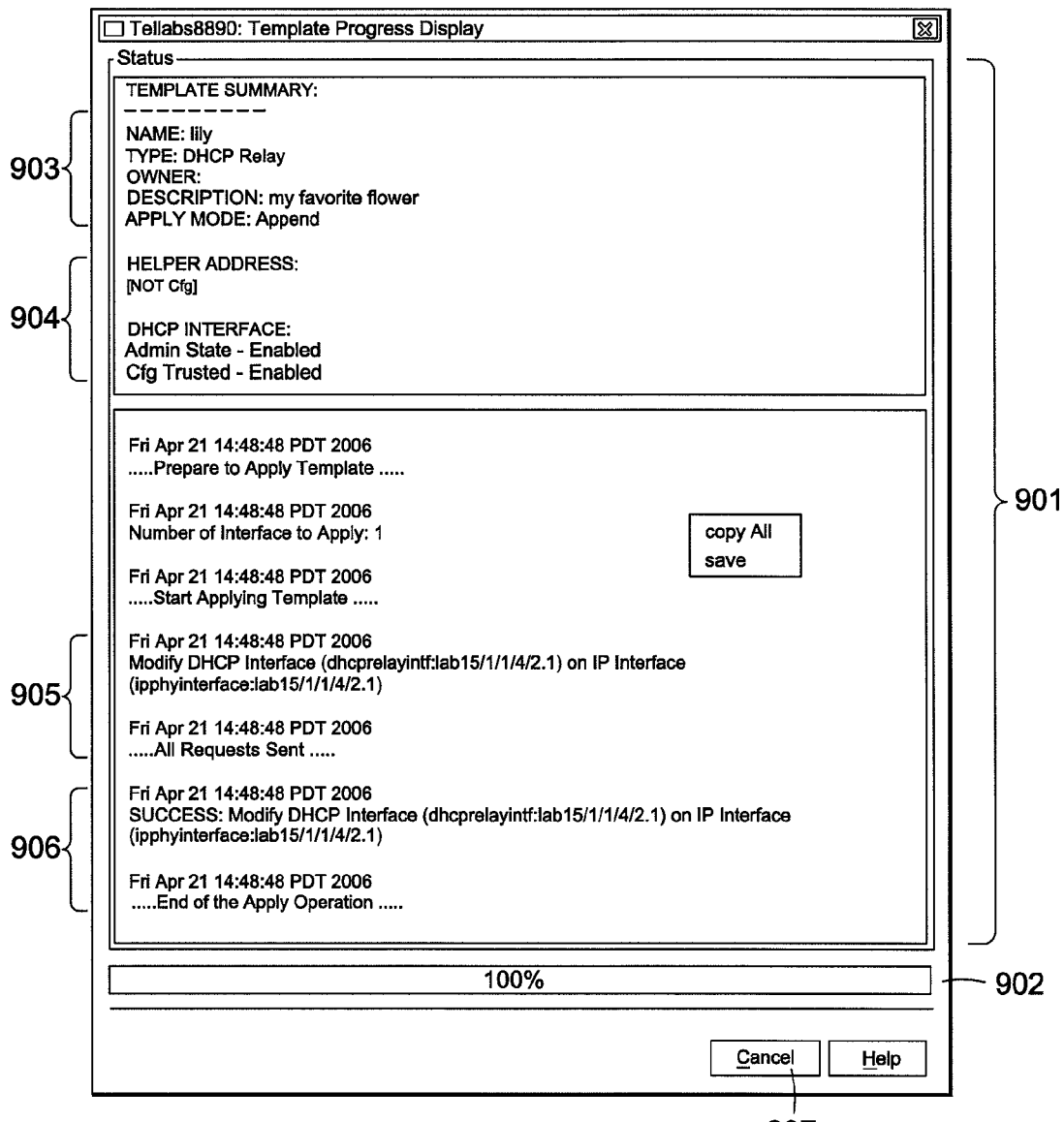
FIG. 9 is an example of a progress dialog monitoring the application of template attributes to network entities in accordance with an example embodiment of the present invention.

The administrator selects the add button 701 to pick a network entity 213 for application. A select entity dialog 800 as shown in FIG. 8 is brought up by the template handler 207 which retrieves a list of network entities 213 from the database 203 via the RG layer 219. The list of network entities is filtered based on the template type 509 selected by the administrator. The administrator then selects network entities 213 for application of the template attributes 604 from an entity list 801 in the select entity dialog 800. After the administrator selects network entities 213 from the entity list 801, the administrator selects the OK button 802 and the select panel 700 is populated with the entity rows 702 corresponding to network entities 213 selected from the entity list 801. The administrator can continue to add entity rows 702 to the select panel 700 in the same fashion or may delete an entity row 702 by selecting the entity row 702 and selecting the delete button 703.

The entity rows 702 comprise the list of entities to apply referred to in block S307 of FIG. 3. The list of entities to apply in this example embodiment, however, would not include entity rows 702 with an apply status 705 of "Successful."

The apply status 705 indicates the success of previous apply operations of the template to particular network entities 213. Once a template has been modified, the apply status 705 of the entity rows 702 are changed to "None" since the new modifications have not been applied. Similarly, when a new entity row 702 is added to the select panel 700 of an existing template, its apply status is also "None." After an apply operation, as discussed in reference to FIG. 3, only network entities 213 corresponding to entity rows 702 with apply status 705 of "None," "Partial," or "Failed" will be affected by a subsequent application using the same unmodified template. During the apply operation, the apply status 705 can be updated with each confirmation 225 as discussed in reference to block S322 of FIG. 3. The select panel 700 also includes an entity status summary 704 that indicates the overall apply status 705 for all of the entity rows 702.

Once the select panel 700 is populated with at least one entity row 702, the administrator may begin the apply operation, as shown in detail in FIG. 3, by selecting the apply button 706. The following description corresponds to application blocks S405 and S406, and application monitoring blocks S407, S408, and S409 of FIG. 4.

After the administrator selects the apply button 706, the progress dialog 900 is brought up by the template handler 207. This example of a progress dialog 900 includes an operation log 901 and a progress bar 902.

The top half of the operation log 901 displays general template information 903 about the template being applied such as its name, type, owner, apply mode, and description. The top half of the operation log 901 also displays configuration information 904 indicating the template attributes 604 being applied to network entities 213 during the apply operation.

The bottom half of the operation log 901 displays status information including request status 905 and configuration status 906 of the apply operation.

During the apply operation, the administrator may select the cancel button 907 in the progress dialog 900 to stop the application of template attributes 604 to the selected network entities 213. This block corresponds to aborting the apply operation in block S406 of FIG. 4.

If the administrator does not select the cancel button 907, the apply operation continues until it reaches block S325 in FIG. 3. The graphical user interface then asks the administrator if they want to copy or save the operation log 901. After saving the operation log, for example as a text file at the client 201, the template handler 207 returns the graphical user interface 205 to the template summary 500.

Figure 10:
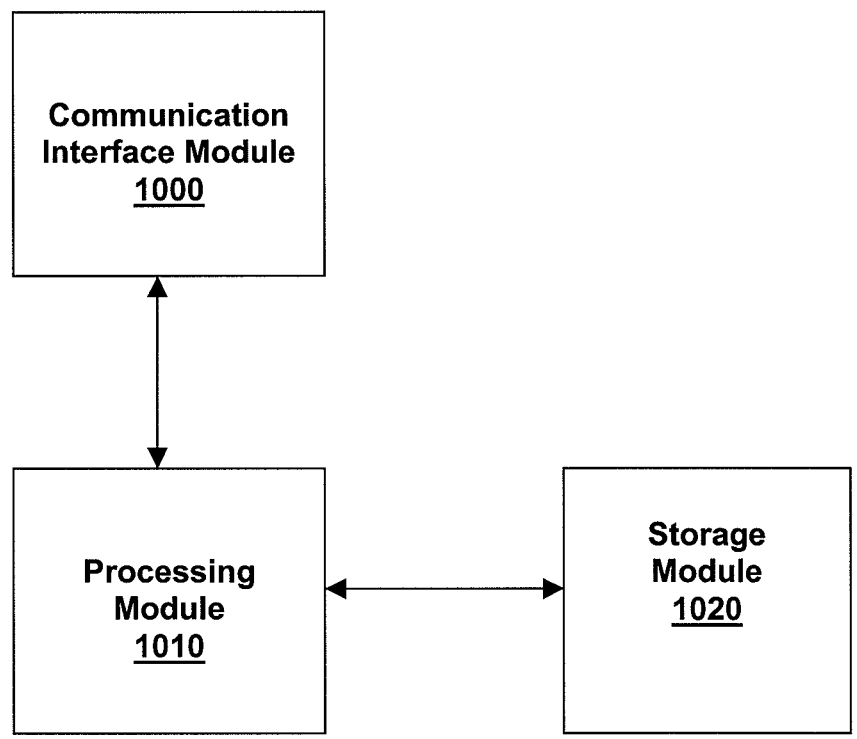
FIG. 10 is a logical diagram of functional modules in accordance with an example embodiment of the present invention.

FIG. 10 is a logical diagram of modules in accordance with an example embodiment of the present invention. The modules may be of a data processing system, which, according to an example embodiment, can form individual ones of template handler 207, network management system 160, and/or any other type of a network device supporting a network management protocol (e.g., SNMP). The modules may be implemented using hardcoded computational modules or other types of circuitry, or a combination of software and circuitry modules.

Communication interface module 1000 controls client 201 by processing interface commands. Interface commands may be, for example, commands to send data, commands to communicatively couple with another device, or any other suitable type of interface command.

Storage module 1020 stores and retrieves data (e.g., attributes of network entities, events or alarms, and template objects) in response to requests from processing module 1010.

In the case of at least the template handler 207, processing module 1010 performs the procedures as described above in connection with FIGS. 3A, 3B, and 3C for the template handler 207. Processing module 1010 checks whether an apply operation for the template being applied is already in-progress. If a template in not already in-progress, processing module 1010 updates the template status to in-progress. After updating the template status, processing module 1010 displays a progress dialog for monitoring the apply operation. After displaying the progress dialog, the processing module 1010 prepares for the apply operation. The processing module 1010 starts by compiling a list of entities received from the communication interface module 1000. If the list of entities to apply is empty, the processing module 1010 starts the apply operation, as described above in FIG. 3A.

If the list of entities to apply is not empty, the processing module 1010 retrieves the first or next entity and validates the entity against template content. If the processing module 1010 finds that the entity is not valid, the processing module 1010 proceeds to check the validity of the next entity. Once an entity is found to be valid, the processing module 1010 constructs a request for transmission and sends it to communication interface module 1000, as described above in FIG. 3B.

Once the processing module 1010 has either constructed a request or has determined that the each selected entity on the list of entities is not valid, the processing module 1010 collects the requests constructed into a request list. If the request list is not empty, the processing module 1010 retrieves and sends the first request and marks the request sent. The processing module 1010 then updates an operation log and the progress dialog. After updating the status of the sent request, the processing module 1010 determines whether there are more requests to send. If there are no more requests left, the processing module 1010 waits for a confirmation from the communication interface module 1000 corresponding to the sent request. When a confirmation is received, the processing module 1010 marks the request confirmed and updates the operation log and progress dialog. If there are no more confirmations to be received, processing module 1010 ends the operation, as described above in FIG. 3C.

In the case of at least the network management system 160, processing module 1010 follows direction from an administrator and performs the procedures as described above in connection with FIG. 4 for the network management system. At the direction of an administrator, the processing module 1010 creates a template and either revises the template or does not revise the template. If the administrator chooses to revise the template, the processing module 1010 modifies the template content and selects entities to apply. If the administrator then chooses to save the template, the processing module 1010 starts the apply operation. The administrator may choose to cancel the apply operation, and if so, the processing module 1010 aborts the apply operation, saves the operation log, and exits. If the administrator does not cancel the operation, the processing module 1010 views the operation output and determines whether the apply operation is successful. If the apply operation was successful, the processing module 1010 saves the operation log and exits, as described above in FIG. 4.

While various example embodiments of the present invention have been described above, it should be understood that the embodiments have been presented by way of example, and not limitation. It will be apparent to persons skilled in the relevant art(s) that various changes in form and detail can be made therein without departing from the spirit and scope of the present invention. Thus, the present invention should not be limited by the above-described example embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A network configuration apparatus facilitating the configuration of network entities comprising:

a graphical user interface that includes a graphical template including at least two configurable administrator modifiable areas corresponding to template attributes; and a template handler that, (1) in response to a request to apply the template attributes, extracts the template attributes from the graphical template and sends messages to agents included in network elements, wherein the agents configure attributes of the network entities to match the extracted template attributes based on the messages, and (2) in response to the request to apply the template attributes and before sending the messages, checks the extracted template attributes for a valid configuration, by comparing attributes of the network entities with the extracted template attributes, wherein when the template handler checks the extracted template attributes for a valid configuration, the template handler compares attributes of a first selected network entity with the extracted template attributes, and if it is determined that the extracted template attributes are not permissible based on the comparison, the template handler skips the first selected network entity and compares attributes of a next selected network entity with the extracted template attributes, before sending the messages, and wherein at least one of the graphical user interface and the template handler are included in a computer, and the messages are sent based on the comparison.

2. An apparatus as in claim 1, wherein the graphical user interface includes a graphical template management menu facilitating the addition and management of graphical templates created by the template handler.

3. An apparatus as in claim 1, wherein the graphical user interface includes a graphical progress dialog for monitoring the application of the extracted template attributes to the network entities based on the messages sent by the template handler and confirmations received by the template handler, the graphical progress dialog comprising:
an operation log generated based on the messages sent by the template handler and confirmations received by the template handler; and
a progress bar indicating a progress of the application of the extracted template attributes.

4. An apparatus as in claim 3, wherein the operation log displays:
template information including at least one of a template name, type, owner, apply mode, and description;
configuration information indicating the template attributes being applied; and
status information including request status and configuration status.

5. A method of configuring network entities comprising:
displaying a graphical user interface that includes a graphical template including at least two configurable administrator modifiable areas corresponding to template attributes;
extracting, in response to a request to apply the template attributes, the template attributes from the graphical template;
checking, in response to the request to apply the template attributes, the extracted template attributes for a valid configuration, by comparing attributes of the network entities with the extracted template attributes, wherein when checking the extracted template attributes for a valid configuration, the attributes of a first selected network entity are compared with the extracted template attributes, and if it is determined that the extracted template attributes are not permissible based on the comparison, the first selected network entity is skipped and attributes of a next selected network entity are compared with the extracted template attributes, before sending the messages; and based on the comparison, applying the extracted template attributes to the network entities by sending messages to agents included in network elements, wherein the agents configure attributes of the network entities to match the extracted template attributes based on the messages.

6. A method as in claim 5, wherein displaying a graphical user interface includes displaying a graphical template management menu facilitating the addition and management of graphical templates created by a template handler.

7. A method as in claim 5, wherein displaying a graphical user interface includes displaying a graphical progress dialog for monitoring the application of the extracted template attributes to the network entities based on messages sent by a template handler and confirmations received by the template handler, the graphical progress dialog comprising:
an operation log generated based on the messages sent by the template handler and confirmations received by the template handler; and
a progress bar indicating a progress of the application of the extracted template attributes.

8. A method as in claim 7, wherein the operation log displays:
template information including at least one of a template name, type, owner, apply mode, and description;
configuration information indicating the template attributes being applied; and
status information including request status and configuration status.

9. A non-transitory computer readable medium including a stored computer executable program, the computer executable program comprising:
code to display a graphical user interface that includes a graphical template including at least two configurable administrator modifiable areas corresponding to template attributes;
code to extract, in response to a request to apply the template attributes, the template attributes from the graphical template;
code to check, in response to the request to apply the template attributes, the extracted template attributes for a valid configuration, by comparing attributes of the network entities with the extracted template attributes, wherein when checking the extracted template attributes for a valid configuration, the attributes of a first selected network entity are compared with the extracted template attributes, and if it is determined that the extracted template attributes are not permissible based on the comparison, the first selected network entity is skipped and attributes of a next selected network entity are compared with the extracted template attributes, before sending the messages; and
code to apply, based on the comparison, the extracted template attributes to the network entities by sending messages to agents included in network elements, wherein the agents configure attributes of the network entities to match the extracted template attributes based on the messages.

10. The non-transitory computer readable medium of claim 9, wherein the code to display a graphical user interface includes code to display a graphical template management menu facilitating the addition and management of graphical templates created by a template handler.

11. The non-transitory computer readable medium of claim 9, wherein the code to display a graphical user interface includes code to display a graphical progress dialog for monitoring the application of the extracted template attributes to the network entities based on messages sent by a template handler and confirmations received by the template handler, the graphical progress dialog comprising:
an operation log generated based on the messages sent by the template handler and confirmations received by the template handler; and
a progress bar indicating a progress of the application of the extracted template attributes.

12. The non-transitory computer readable medium of claim 11, wherein the operation log displays:
template information including at least one of a template name, type, owner, apply mode, and description;
configuration information indicating the template attributes being applied; and
status information including request status and configuration status.

13. A programmed computing apparatus comprising:
a memory for storing a graphical user interface, a graphical template, administrator input, template attributes, a network entity list, and a computer executable method; and
a processor for executing the computer executable method stored in the memory;
wherein the computer executable method comprises displaying the graphical user interface that includes a graphical template including at least two configurable administrator modifiable areas corresponding to template attributes,
extracting, in response to a request to apply the template attributes, the template attributes from the graphical template,
checking, in response to the request to apply the template attributes, the extracted template attributes for a valid configuration, by comparing attributes of the network entities with the extracted template attributes, wherein when checking the extracted template attributes for a valid configuration, the attributes of a first selected network entity are compared with the extracted template attributes, and if it is determined that the extracted template attributes are not permissible based on the comparison, the first selected network entity is skipped and attributes of a next selected network entity are compared with the extracted template attributes, before sending the messages, and
based on the comparison, applying the extracted template attributes to network entities by sending messages to agents included in network elements, wherein the agents configure attributes of the network entities to match the extracted template attributes based on the messages.

14. The programmed computing apparatus of claim 13, wherein displaying a graphical user interface includes displaying a graphical template management menu facilitating the addition and management of graphical templates created by a template handler.

15. The programmed computing apparatus of claim 13, wherein displaying a graphical user interface includes displaying a graphical progress dialog for monitoring the application of the extracted template attributes to the network entities based on messages sent by a template handler and confirmations received by the template handler, the graphical progress dialog comprising:
an operation log generated based on the messages sent by the template handler and confirmations received by the template handler; and
a progress bar indicating a progress of the application of the extracted template attributes.

16. The programmed computing apparatus of claim 15, wherein the operation log displays:
template information including at least one of a template name, type, owner, apply mode, and description;
configuration information indicating the template attributes being applied; and
status information including request status and configuration status.

* * * * *